US007059083B2

(12) United States Patent
Abitz et al.

(10) Patent No.: US 7,059,083 B2
(45) Date of Patent: Jun. 13, 2006

(54) SEEDBED FOR GROWING VEGETATION

(75) Inventors: Peter Robert Abitz, Saint Simons Island, GA (US); John Leigh Westney, III, Jesup, GA (US); Bradley Daniel Page, Waycross, GA (US); Douglas Paul Seekins, Burnswick, GA (US)

(73) Assignee: Gp Cellulose, LLC, Atlanta, GA (US)

( * ) Notice: Subject to any disclaimer, the term of this patent is extended or adjusted under 35 U.S.C. 154(b) by 0 days.

(21) Appl. No.: 10/776,331

(22) Filed: Feb. 12, 2004

(65) Prior Publication Data

US 2005/0028441 A1 Feb. 10, 2005

Related U.S. Application Data

(60) Provisional application No. 60/446,514, filed on Feb. 12, 2003.

(51) Int. Cl.
A01C 1/04 (2006.01)
A01G 7/00 (2006.01)
(52) U.S. Cl. .................................. 47/56; 47/9
(58) Field of Classification Search ............ 47/56
See application file for complete search history.

(56) References Cited

U.S. PATENT DOCUMENTS

| 526,512 A | * | 9/1894 | Weber ................... 47/56 |
|---|---|---|---|
| 1,846,274 A | | 2/1932 | Otwell |
| 2,309,702 A | * | 1/1943 | Kirschenbaum ........... 47/56 |
| 2,923,093 A | | 2/1960 | Allen |
| 2,976,646 A | | 3/1961 | Hansen et al. |
| 3,600,852 A | | 8/1971 | Burke et al. |
| 3,846,956 A | | 11/1974 | Johnson |
| 3,888,041 A | | 6/1975 | Seith et al. |
| 3,889,417 A | | 6/1975 | Wood et al. |
| 3,890,910 A | | 6/1975 | Angruner |
| 3,914,901 A | | 10/1975 | Muldner |
| 3,981,100 A | | 9/1976 | Weaver et al. |
| 4,066,490 A | | 1/1978 | Yoshimi |
| 4,067,140 A | | 1/1978 | Thomas |
| 4,173,844 A | | 11/1979 | Knolle et al. |
| 4,190,981 A | | 3/1980 | Muldner |
| 4,232,481 A | | 11/1980 | Chamoulaud |
| 4,272,919 A | | 6/1981 | Schmidt |
| 4,283,880 A | | 8/1981 | Fjeldsa |
| 4,318,248 A | | 3/1982 | Muldner |
| 4,357,780 A | | 11/1982 | Ball |
| 4,364,197 A | | 12/1982 | Baron |
| 4,369,054 A | | 1/1983 | Shinholster, Jr. et al. |

(Continued)

FOREIGN PATENT DOCUMENTS

AU 197581394 A1 * 5/1975

(Continued)

Primary Examiner—Francis T. Palo

(57) ABSTRACT

An artificial seedbed used in growing vegetation. The artificial seedbed comprises a base layer formed of a biodegradable product having a porosity and wet density that permit a root of the desired vegetation to penetrate the base layer and establish the vegetation for growing. The artificial seedbed also comprises an intermediate layer comprising a plurality of seeds for use in growing the desired vegetation. A cover layer cooperates with the base layer to form an envelope about the intermediate layer. The cover layer can be coextensive with the base layer and secured to the base layer by a bonding agent. The cover layer is formed of the same or different biodegradable product as the base layer. The material used in the cover layer permits the sprouting vegetation to penetrate it during the growing process.

18 Claims, 5 Drawing Sheets

U.S. PATENT DOCUMENTS

| | | | |
|---|---|---|---|
| 4,414,776 A * | 11/1983 | Ball | 47/56 |
| 4,429,001 A | 1/1984 | Kolpin et al. | |
| 4,433,024 A | 2/1984 | Eian | |
| 4,584,790 A | 4/1986 | Gaughen | |
| 4,604,313 A | 8/1986 | McFarland et al. | |
| 4,665,648 A | 5/1987 | Branco et al. | |
| 4,720,935 A | 1/1988 | Rogers et al. | |
| 4,724,781 A | 2/1988 | Higashimura et al. | |
| 4,786,308 A | 11/1988 | Colling | |
| 4,786,550 A | 11/1988 | McFarland et al. | |
| 4,790,691 A | 12/1988 | Freed | |
| 4,794,726 A | 1/1989 | Fawcett et al. | |
| 4,819,933 A | 4/1989 | Armond | |
| 4,867,614 A | 9/1989 | Freed | |
| 4,900,010 A | 2/1990 | Wengmann et al. | |
| 4,910,911 A | 3/1990 | Ahm | |
| 4,916,855 A | 4/1990 | Halliday et al. | |
| 4,934,094 A | 6/1990 | Walton | |
| 4,941,282 A | 7/1990 | Milstein | |
| 4,986,026 A | 1/1991 | Decker | |
| 5,014,462 A | 5/1991 | Malmgren et al. | |
| 5,033,231 A | 7/1991 | Sakate et al. | |
| 5,073,401 A * | 12/1991 | Mohr | 426/658 |
| 5,099,599 A | 3/1992 | Ellison | |
| 5,101,594 A | 4/1992 | Ahm | |
| 5,120,344 A | 6/1992 | Libor et al. | |
| 5,177,898 A | 1/1993 | Decker | |
| 5,189,833 A | 3/1993 | Clark | |
| 5,205,068 A | 4/1993 | Solomou | |
| 5,209,768 A | 5/1993 | Hughes | |
| 5,224,290 A | 7/1993 | Molnar | |
| 5,224,292 A | 7/1993 | Anton | |
| 5,226,255 A | 7/1993 | Robertson | |
| 5,235,781 A | 8/1993 | Holley | |
| 5,245,785 A | 9/1993 | Taniguchi et al. | |
| 5,274,951 A | 1/1994 | Besing | |
| 5,301,466 A | 4/1994 | Egan | |
| 5,326,192 A | 7/1994 | Freed | |
| 5,330,828 A | 7/1994 | Jacobsen, Jr. | |
| 5,344,470 A | 9/1994 | Molnar et al. | |
| 5,345,713 A | 9/1994 | Molnar et al. | |
| 5,346,514 A | 9/1994 | Molnar et al. | |
| 5,397,368 A | 3/1995 | Molnar et al. | |
| 5,404,671 A | 4/1995 | Farrow, Jr. et al. | |
| 5,417,010 A * | 5/1995 | Ecer | 47/56 |
| 5,421,123 A | 6/1995 | Sakate et al. | |
| 5,464,455 A | 11/1995 | Molnar | |
| 5,484,501 A | 1/1996 | Jacobsen, Jr. et al. | |
| 5,489,317 A | 2/1996 | Bergevin | |
| 5,490,351 A | 2/1996 | Molnar et al. | |
| 5,507,845 A | 4/1996 | Molnar et al. | |
| 5,555,674 A | 9/1996 | Molnar et al. | |
| 5,562,646 A | 10/1996 | Goldman | |
| 5,591,149 A | 1/1997 | Cree | |
| 5,599,335 A | 2/1997 | Goldman | |
| 5,647,951 A | 7/1997 | Bayer | |
| 5,651,213 A | 7/1997 | Egan | |
| 5,669,894 A | 9/1997 | Goldman | |
| 5,672,434 A | 9/1997 | Dalebroux et al. | |
| 5,681,300 A | 10/1997 | Ahr | |
| 5,802,763 A | 9/1998 | Milstein | |
| 5,836,107 A | 11/1998 | Behrens | |
| 5,853,541 A | 12/1998 | Monroe et al. | |
| 5,860,245 A | 1/1999 | Welch | |
| 5,860,246 A | 1/1999 | Strombom | |
| 5,866,269 A | 2/1999 | Dalebroux et al. | |
| 5,879,695 A | 3/1999 | Bastiaansen et al. | |
| 5,887,382 A | 3/1999 | Marshall et al. | |
| 5,911,632 A | 6/1999 | Ko | |
| 5,934,011 A | 8/1999 | Ishioka et al. | |
| 5,974,732 A | 11/1999 | Saito | |
| 6,009,663 A | 1/2000 | Kazemzadeh | |
| 6,022,827 A | 2/2000 | Kumar | |
| 6,029,395 A | 2/2000 | Morgan | |
| 6,032,410 A | 3/2000 | Kumar | |
| 6,065,601 A | 5/2000 | Weder | |
| 6,070,358 A | 6/2000 | Meikle et al. | |
| 6,088,957 A | 7/2000 | Kazemzadeh | |
| 6,123,036 A | 9/2000 | Decker | |
| 6,158,168 A | 12/2000 | Behrens | |
| 6,233,867 B1 | 5/2001 | Gibson | |
| 6,250,010 B1 | 6/2001 | Behrens | |
| 6,319,342 B1 | 11/2001 | Riddell | |
| 6,324,781 B1 | 12/2001 | Stevens | |
| 6,334,275 B1 | 1/2002 | Egan | |
| 6,351,911 B1 | 3/2002 | Behrens | |
| 6,357,176 B1 | 3/2002 | Baldwin et al. | |
| 6,389,745 B1 | 5/2002 | Huh | |
| 6,417,120 B1 | 7/2002 | Mitchler | |
| 6,423,123 B1 | 7/2002 | Rosenberg | |
| 6,446,386 B1 | 9/2002 | Holloway | |
| 6,532,697 B1 | 3/2003 | Egan | |
| 6,578,317 B1 | 6/2003 | Ahm | |
| 6,601,340 B1 | 8/2003 | Behrens | |
| 6,658,790 B1 | 12/2003 | Skuba | |
| 6,681,521 B1 * | 1/2004 | Holloway | 47/56 |
| 6,694,670 B1 | 2/2004 | Egan | |
| 2002/0011024 A1 | 1/2002 | Baldwin et al. | |
| 2002/0056227 A1 | 5/2002 | Skuba | |
| 2003/0000139 A1 | 1/2003 | Anderson | |
| 2003/0000140 A1 | 1/2003 | Ahm | |
| 2003/0140553 A1 | 7/2003 | Moore | |
| 2003/0230027 A1 | 12/2003 | Egan | |
| 2004/0025422 A1 | 2/2004 | MacQuoid et al. | |
| 2004/0237388 A1 | 12/2004 | Moore | 47/9 |

FOREIGN PATENT DOCUMENTS

| | | | |
|---|---|---|---|
| DE | 1566161 | * | 4/1980 |
| GB | 2270453 A | * | 3/1994 |

* cited by examiner

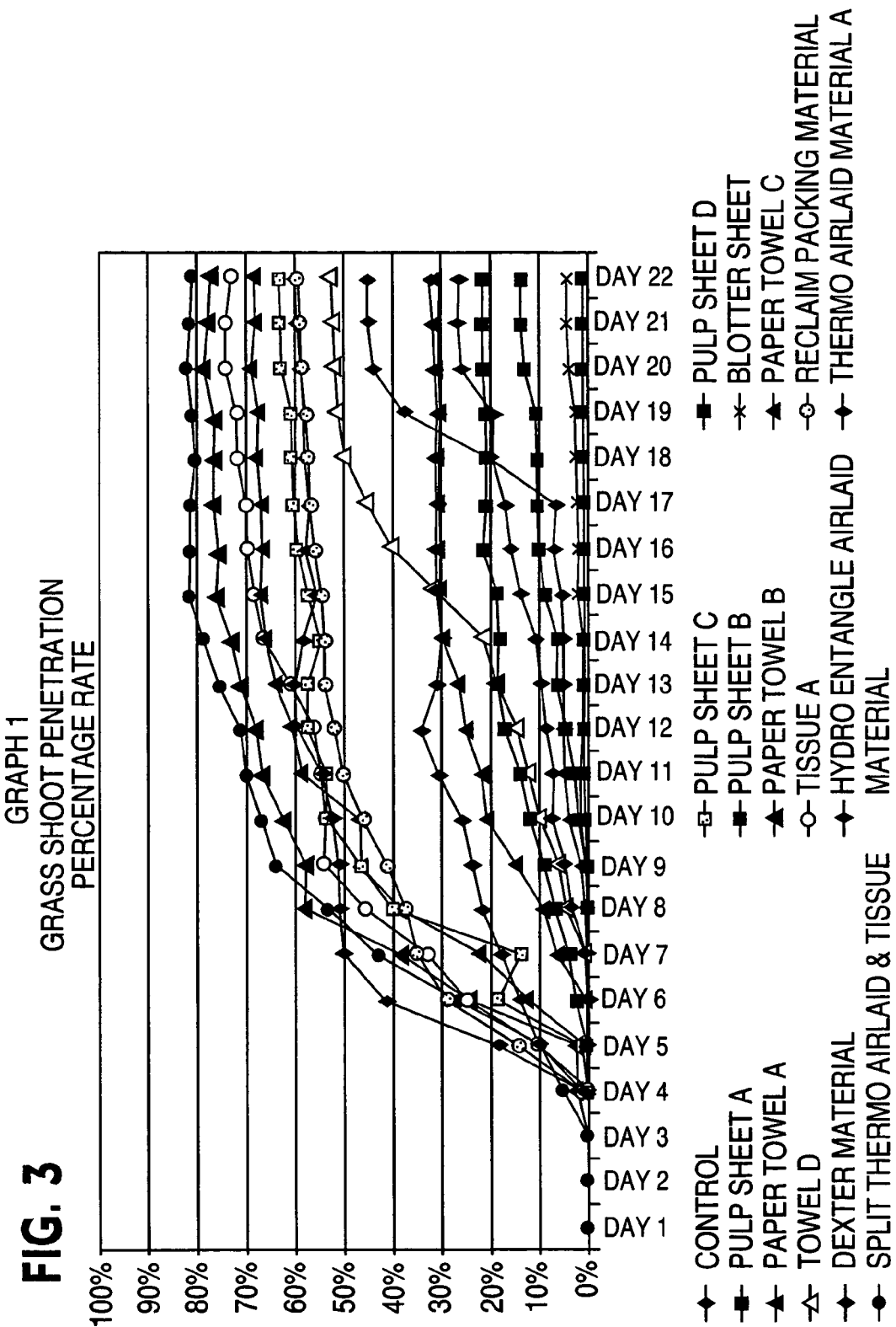

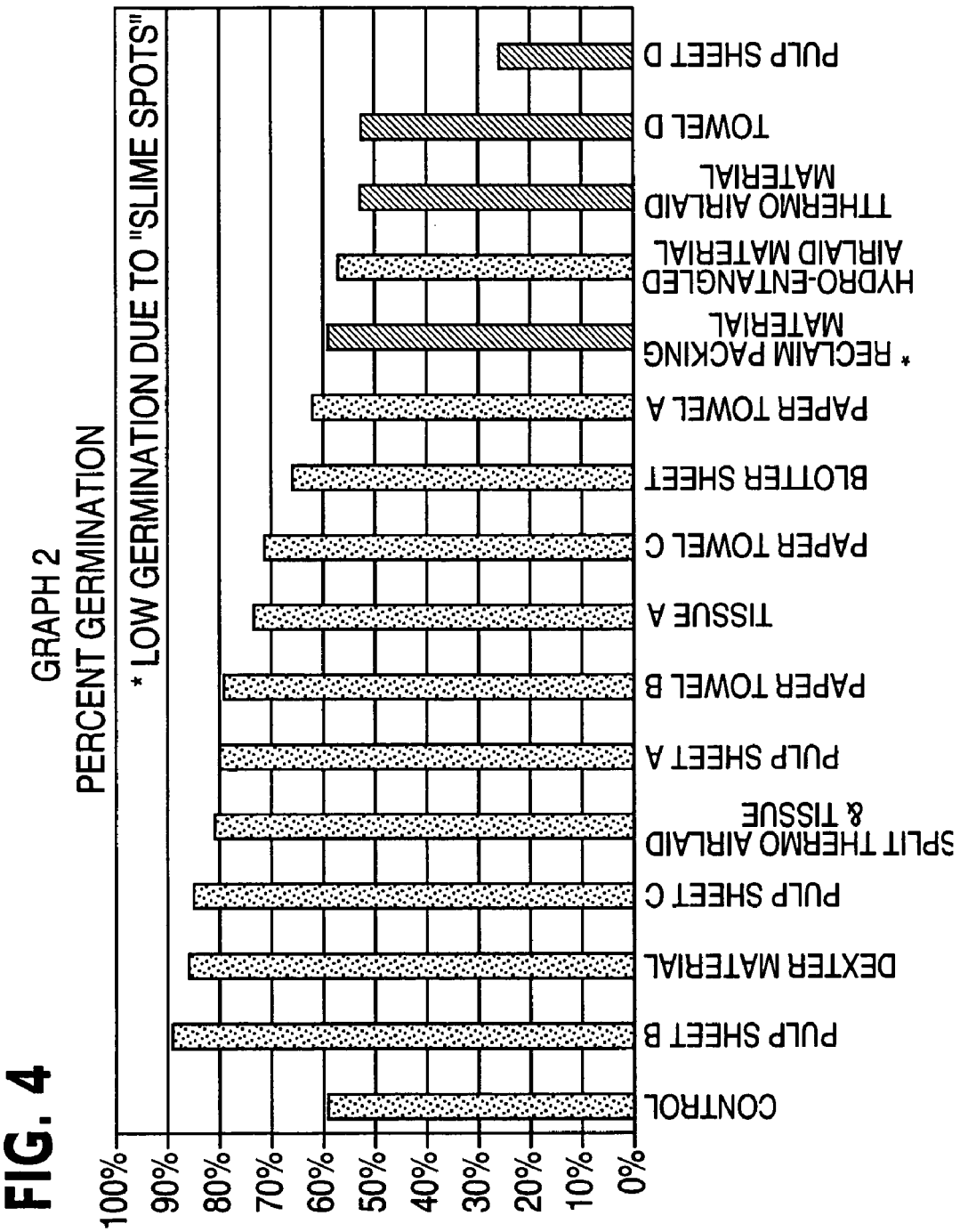

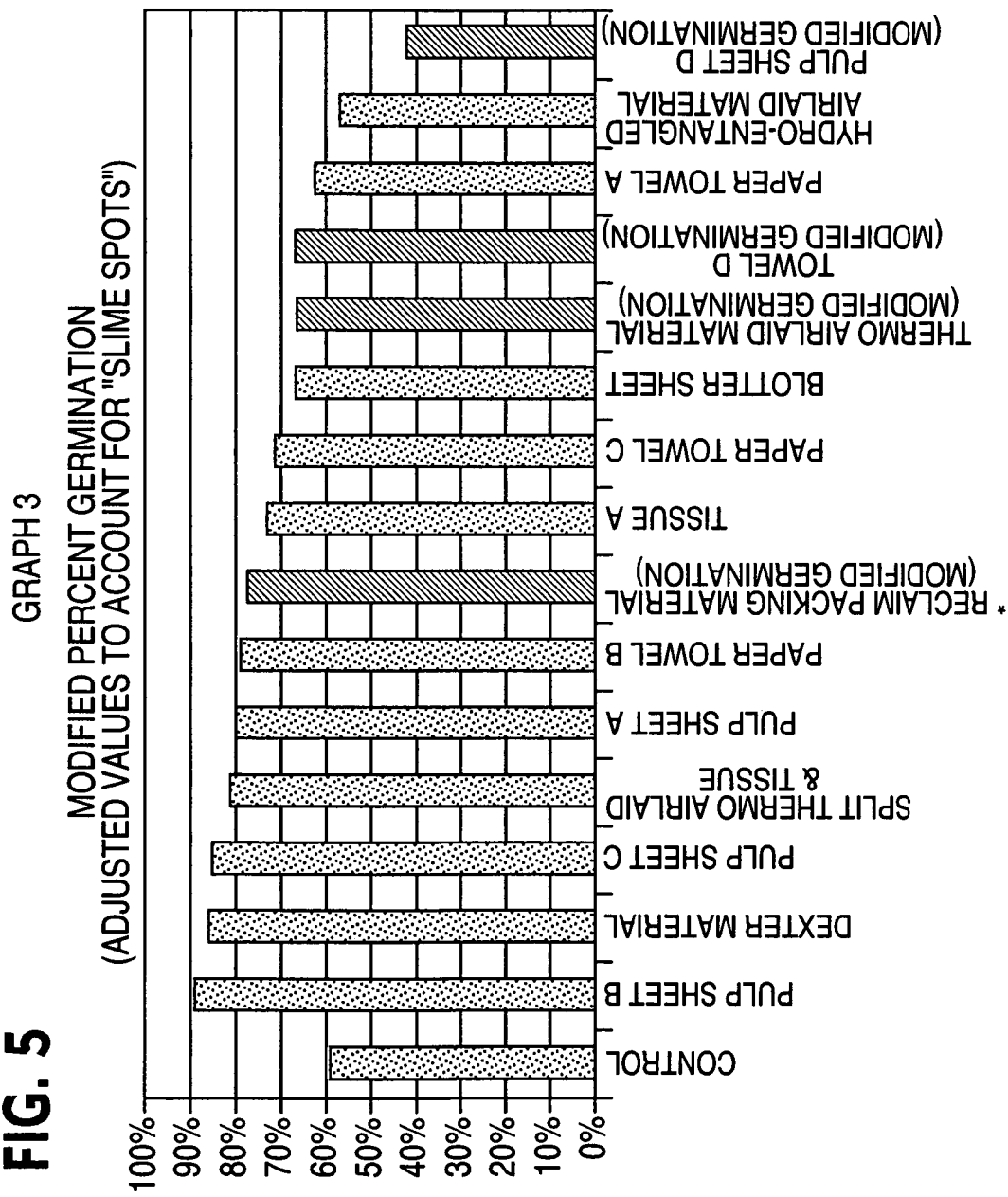

SEEDBED FOR GROWING VEGETATION

CROSS-REFERENCE TO RELATED APPLICATION

This application claims benefit under 37 CFR §1.78 of provisional application 60/446,514 filed Feb. 12, 2003. The full disclosure of the application is incorporated herein by reference.

FIELD OF THE INVENTION

The present invention relates to an article and method used in growing vegetation and, more particularly, to a seedbed and method for growing vegetation by applying seeds and fertilizer to a planting area and maintaining nutrients within this planting area in order promote germination and growth of predetermined vegetation.

BACKGROUND OF THE INVENTION

Grass seed is sown by various known procedures. These procedures include hand seeding, "hydro-seeding" and using mats that form artificial seedbeds. Hand seeding is an old and well-known way of applying grass seed to the soil. According to the hydro-seeding method, grass seeds are mixed in a dissolved fiber solution and are dispersed on the surface of the ground. In the methods that employ a mat as an artificial seedbed, the mat is placed on top of the soil in order to grow and keep germinated grass warm and moist.

Many forms of artificial seedbeds, including seed mats and carpets, intended for growing grass and other forms of vegetation are known in the art. A conventional such seed mat is disclosed in U.S. Pat. No. 4,190,981 to Muldner. This conventional seed mat includes a base layer of water pervious web material, a bed of seeds and compressed peat particles as a middle layer, and an upper layer comprising a fibrous, porous veil. However, this upper layer does not have sufficient wet strength to support and position the seeds after watering commences. Also, the upper layer can prematurely degrade, thereby exposing and failing to protect young seedlings from other elements and birds.

It is therefore an object of the present invention to provide an improved artificial seedbed, in effect, an engineered seedbed with predetermined physical properties that enhances safe sprouting and growth of young vegetation. It is also an object of the present invention that provides an artificial seed bed with a lower layer that will be porous enough to allow roots to extend through it, but yet strong enough to support the seeds and retain some of the temperature and humidity of the soil around the seeds during seed germination and growth. It is a further object of this invention to provide an artificial seedbed with an upper layer that has a density and porosity that allows extensive sprouting of the shoots from the seed, while still being strong enough to protect these sprouting shoots from their environment.

SUMMARY OF THE INVENTION

The present invention includes a convenient article and effective method for applying seed and fertilizer to a large area in a one-step process in order to cause the growth of a plant such as grass. In one embodiment, the invention includes a rolled product that carries seed and fertilizer contained in a biodegradable matrix of cellulose fibers and biodegradable binding adhesives. This matrix will allow for easy application and will initially protect the seeds, but will quickly compost into the soil and allow for normal turf maintenance in 4–6 weeks.

The seedbed can be used in residential applications and in commercial applications such as golf course construction and maintenance and roadway median maintenance as well as private home lawn and garden applications. Unlike conventional turf sodding or seeding practices, the present invention is less labor-intensive with respect to its lay-down and maintenance. The seedbed contains fertilizers eliminating the additional labor required for fertilizer laydown with conventional seeding and sodding methods. It also produces improved seed germination relative to conventional broadcast seeding methods and full ground coverage for improved erosion control that reduces the potential for serious environmental degradation of adjacent streams and wetland areas. Additionally, the full ground coverage provided by the present invention provides improved weed control that reduces and in some circumstances eliminates the need for pesticide applications. The stabilization provided by the layers of the laminate prevents migration due to wind and rain, especially on sloping terrains, thereby eliminating the need for expensive reworking. Also, the decomposition of cellulose adds organic matter to the base soil enhancing healthy plant growth and sustainability. In certain embodiments, the seedbed contains only natural, biodegradable components thereby eliminating the deposition of possibly undesirable synthetic materials in the environment. Additionally, certain embodiments can include a soil contacting layer that includes a conventional soil conditioner.

An embodiment according to an aspect of the present invention includes an article for use in growing vegetation. The article comprises a base layer formed of a biodegradable product having a porosity and wet density that permit a root of the vegetation to penetrate the base layer and establish the vegetation for growth. The article also comprises an intermediate layer comprising a plurality of seeds for use in growing the vegetation. The article further comprises a cover layer that is coextensive with the base layer and secured to the base layer by a bonding agent. The cover layer is formed of the same biodegradable product as the base layer and has the same porosity and wet density as the base layer such that sprouting vegetation is capable of penetrating the cover layer.

Another aspect of the present invention comprises an article for use in growing vegetation comprising a base layer formed of a biodegradable natural fiber having a basis weight of about 23 to about 300 grams per square meter and a wet density of at least about 0.05 grams per cubic centimeter, and a cover layer formed of biodegradable natural fibers having a basis weight of about 13 to about 150 grams per square meter and a wet density of about 0.05 to about 0.20 grams per cubic centimeter. The article also comprises a biodegradable bonding agent for securing the base layer to the cover layer.

A further aspect of the present invention includes an article for use in growing vegetation comprising a base layer formed of wood-derived cellulose fibers, and a cover layer formed of biodegradable natural fibers. The cover layer has a different porosity, a different basis weight and a different density compared to the base layer. The article also comprises an intermediate layer between portions of said base layer and said cover layer. The intermediate layer includes a plurality of seeds for growing the vegetation. Further, the article comprises a bonding agent for securing the base layer to the cover layer such that the cover layer and base layer are sealed together to contain the seeds between the base layer and cover layer.

The present invention also includes a method of making the article according to an aspect of the present invention. The method comprises the steps of providing the base layer formed of biodegradable natural fibers, providing the cover layer formed of biodegradable natural fibers and applying seeds to one of the base layer and the cover layer such that the seeds are distributed on a predetermined portion of the layer to which they are applied. The method also includes the steps of applying the bonding agent to at least one of the layers and securing the cover layer to the base layer such that the cover layer and the base layer form an enclosure around the seeds.

BRIEF DESCRIPTION OF THE FIGURES

FIGS. 3–5 show test results for samples of the artificial seedbed according to the present invention.

DETAILED DESCRIPTION OF THE INVENTION

Figure 1:
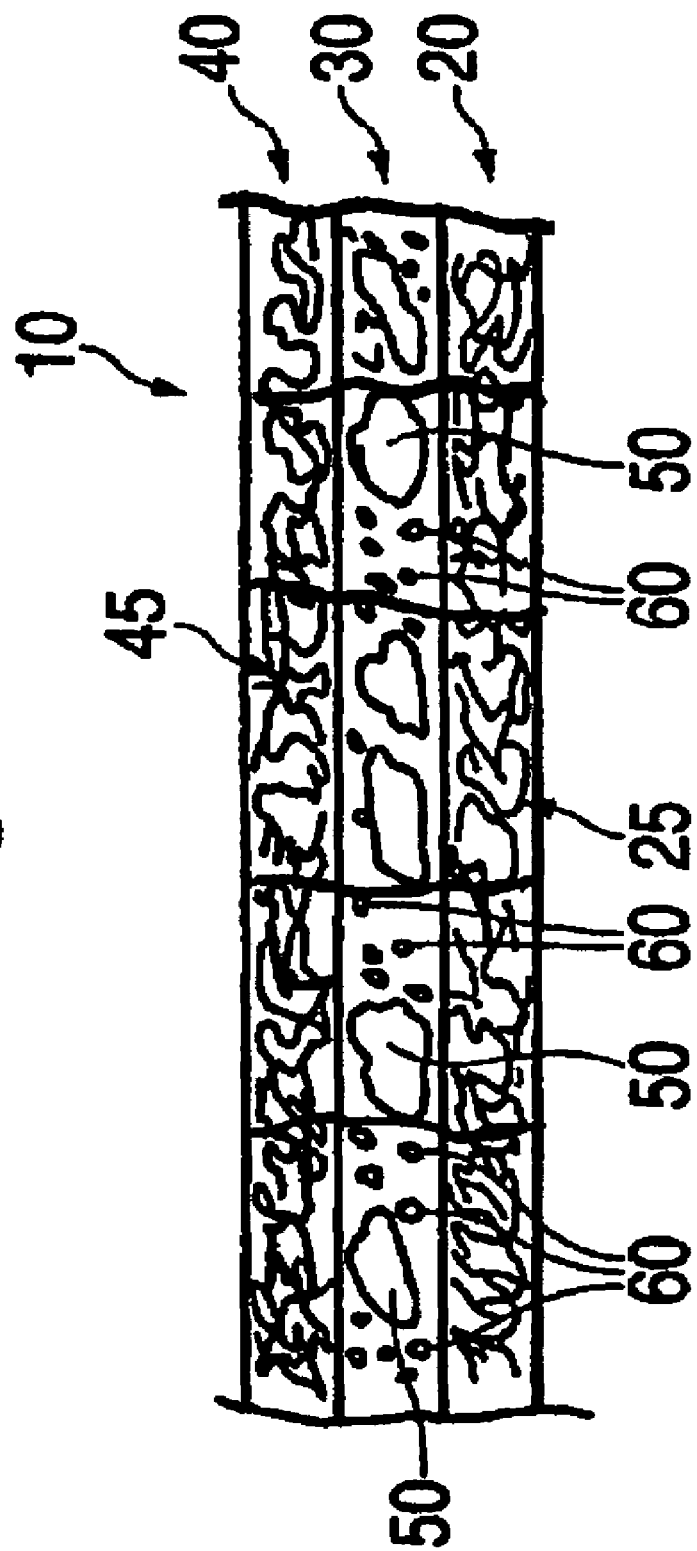
FIG. 1 is a side view of the artificial seed bed according to the present invention.

As illustrated in FIG. 1, the present invention comprises a simulated seedbed 10 including a plurality of layers. This seedbed 10 can be delivered as a rolled or folded article and is used for growing vegetation. As used herein, the term "vegetation" relates to plants that grow from seeds. Examples of vegetation include grass, vegetable plants, vegetable trees, fruit plants, fruit trees and flowering plants that do not produce either edible fruits or vegetables. However, for ease of explanation and understanding, the artificial seedbed 10 according to the present invention will be explained herein as it relates to grass seed. It is understood that the embodiments and concepts of the seedbed 10 discussed herein also apply to seedbeds 10 when they include seeds used to grow vegetation other than grass.

As shown in FIG. 1, the seedbed 10 includes a base layer 20, an intermediate layer 30 and a cover layer 40. The materials used to form the layers 20, 40 preferably include natural fibers that are biodegradable. Among the natural fibers suitable for use in accordance with the present invention are jute fiber, palm fiber, peat, sisal, coconut fiber and wood fiber. In an embodiment including jute fibers, the layer, for example cover layer 40, containing the jute fibers could have a basis weight of about 10 ounces per yard square. In another embodiment, the base layer 20 and cover layer 40 are each formed of a natural, biodegradable product including wood-derived cellulose fibers, such as a paper product or a pulp product. The substrate 25 of layer 20 and substrate 45 of layer 40 are each formed of a different paper or pulp product and form a sealed envelope around layer 30.

The substrates 25, 45, and thus layers 20, 40, can be formed using one or a combination of the following known paper product forming processes: airlaid, wet laid, dry-formed and thermoforming. In an embodiment, the wet laid tissue and toweling substrates have minimal wet-strength added. In a first airlaid embodiment, the airlaid substrates are bonded during a conventional airlaid process using known latex or synthetic fibers that binds to their cellulose. These binders are non-biodegradable and may be included in varying amounts to control the degradation of one or more of the layers 20, 40. In another airlaid embodiment, the present invention includes completely biodegradable starch-based binders. For example, the bonding agents can include a starch-based adhesive, such as potato starch, modified cellulose or polyvinyl alcohol. The starch binder, for example, will provide biodegradability while still providing good dry strength to its respective layer during field application. In an embodiment, a layer of wet-strength material is included in the seedbed 10 to provide a compromise between biodegradability and durability.

According to the invention, the materials used to form the base layer 20 and cover layer 40 have a low enough basis weight, low enough density and high enough porosity to allow good penetration of the grass roots and shoots, respectively. In an embodiment, the basis weights for wet laid products used for base layer 20 and cover layer 40 can range from about 10 to 100 pounds per 3000 square feet. Another preferred range is from about 13 to 50 pounds per 3000 square feet. Additionally, the basis weight range for airlaid products used for both the base layer 20 and the cover layer 40 can be from about 50 to 500 grams per square meter. The above-discussed layers 20, 40 each have porosity in the range of about 25–500 CFM/ft2. The tensile strength of the layers 20, 40 is sufficient to allow the seedbed 10 to be applied without breaking. In an embodiment, the tensile break strength should be between about 2 to 50 N/5 cm and have a tensile elongation of between about 1 to 20%. In at least one of the disclosed embodiments, the layers 20, 40 are biodegradable to the point that it will allow normal mowing in 4–6 weeks of its application. Additionally, the layers 20, 40 have a coherent enough matrix to prevent their material and the intermediate layer 30 from being washed away in rainy conditions.

In an embodiment, the cover layer 40 has greater porosity and lower density compared to the base layer 20 because the shoots from a grass seed are not as strong as the roots of the grass seed. The greater porosity and lower density of the cover layer 40 permit the shoots from the grass seeds 50 to grow through the cover layer 40 without significant opposition and to permit adequate sun to meet with the contained seeds 50. It is contemplated that the cover layer 40 be formed of a substrate that is as light and porous as possible, while still maintaining enough strength to not prematurely disintegrate or blow away. On the other hand, the base layer 20 is a heavier, stronger and denser product when compared to the cover layer 40. This denser and less porous base layer 20 will retain the heat and humidity around the grass seed that aids in germination, while still being porous enough to allow the roots of the grass seedlings to penetrate through it and mesh with the ground. The strength of the base layer 20 also provides the seedbed 10 with the support it needs until sufficient germination has occurred and the grass blades are viable.

In another embodiment, the layers 20, 40 are formed of the same material as illustrated in certain examples in Table I. In these embodiments, the layers 20, 40 surrounding the intermediate layer 30 can have the same basis weight, wet density and porosity.

A raw pulp sheet could be used for either of the layers 20, 40. The pulp sheet provides the strength needed for the base sheet 20. The use of raw pulp sheets for either layer 20, 40 would allow the use of cellulose without the expensive and time consuming pulp converting step conventionally performed on a paper substrate using a known method such as airlaying. However, the chosen raw pulp sheet must be porous enough and have a low enough density to permit the roots or shoots of the grass seed to penetrate through it and establish themselves.

The intermediate layer 30 includes seeds 50 and fertilizer 60. In an embodiment, intermediate layer 30 can also includes other nutrients, growth and/or germination aids that may be desired for the growth of the grass. The intermediate layer also receives the adhesive material used to secure the base layer 20 and the cover layer 40 together around the intermediate layer 30 as they are secured together so that the seeds 50 and fertilizer 60 are securely held in place within the seedbed 10 as discussed below.

The seeds 50 located within the seedbed 10 formed by any of the above-discussed embodiments can be any know type of seed that meets the needs of the end user. For example, the grass seed that forms a portion of layer 30 can be any known grass seed. However, the contained seed or combination of different grass seeds will be dictated by the type of grass to be grown and the geographical location where the grass will be established. As understood, the grass seed used for a golf course fairway will be different from the grass seed used for a putting green on the same course. Similarly, the grass seed/seed mixture for a golf course in Georgia may be different from that used for an industrial park in Oregon or a residential lawn in New Hampshire. Therefore, the grass seed mixture that forms layer 30 can differ from customer to customer, as well as, use to use for the same customer. The seeds used for this product can be of varying types depending on the needs of the customer. In an embodiment, the dosing of seeds in the matrix will be on the order of about 1 to 10 pounds per 1000 square feet of ground to be treated as set forth below:

| Grass Variety | pound/1000 sqft |
| --- | --- |
| Tall Fescue Blend | 10 |
| Perennial Ryegrass Blend | 5 |
| Bluegrass/Ryegrass Mix | 4 |
| Bluegrass Blend | 3 |
| Bentgrass | 1 |

Other types of seeds, for instance those used for growing flowers and vegetables, could also be incorporated in with other types of seeds or replace the grass seed within the seed bed. Additionally, embossing or laminating the base layer 20 and the cover layer 40 so that at least two compartments contain different seeds enable different vegetation to grow from different compartments of the same seedbed 10. As a result, a user can plant a pre-organized garden that will provide predetermined plant growth and a predetermined array of vegetation.

As discussed above, the intermediate layer 30 of seeds 50 and fertilizer 60 is located between the bottom layer 20 and the cover layer 40. The intermediate layer 30 can include those nutrients that assist in the growth and/or timing of germination for the vegetation, such as products including peat and lime.

The fertilizers 60 can include natural or chemical fertilizers or other known additives that aid the growth process of the vegetation. The fertilizer(s) can form part of the matrix of the total seedbed 10 by being introduced onto or into at least one layer 20, 40 of the seedbed 10. For example, a fertilizer can be applied to a surface of the top layer 40 that faces toward the base layer 20. In another embodiment, the fertilizer 60 can be applied to any surface of either of the layers 20, 40. In yet another embodiment, the fertilizer 60 can be formed into one of the layers 20, 40 during the production of the layers 20, 40. Any combination of steps for applying fertilizer to the layers 20, 40 can also be used.

More specifically, the fertilizer 60 can be added to the seedbed 10 by pouring or otherwise applying a granular or powdered fertilizer onto the base layer 20 and in the same layer as the grass seed 50. In an alternative embodiment, the fertilizer 60 takes the form of a liquid that can be sprayed onto the base layer 20, the cover layer 40 or both layers 20, 40. In order to reduce production steps, the fertilizer 60 can be sprayed onto the base layer 20 and/or cover layer 40 simultaneously with the adhesive that is applied to these layers 20, 40 before these layers 20, 40 are laminated together. For example, a liquid fertilizer could be mixed into the solution (potato starch) used to bind the individual layers or into the glue used to laminate the substrates together. Spraying of the fertilizer gives controlled, even distribution of the fertilizer. Controlled distribution can reduce fertilizer costs and provide more even growth. The liquid fertilizer 60 can also be sprayed directly onto the seeds 50 so that it covers the seeds 50.

In an alternative embodiment, the fertilizer 60 can also be applied as a coating to the seeds 50 before the seeds are introduced into the seedbed 10. Such coatings are disclosed in U.S. Pat. No. 6,209,259 to Madigan et al. and U.S. Pat. No. 4,753,035 to Ryan et al., both of which are expressly incorporated herein by reference. The use of coated seeds 50 can increase the ability of the manufacturer to control the amount of fertilizer 60 introduced into the seedbed 10 for each seed 50. Coating the seeds 50 with a fertilizer and other nutrients also increases the proximity of the fertilizer 60 and other introduced nutrients to the seeds 50 in order to allow the seeds to use the nutrients more efficiently and reduces the amount of fertilizer 60 and other nutrients required. The fertilizer-coated seeds 50 also allow both seeds and fertilizer to be added to the product in one step, thereby reducing the number of production steps required to produce the seedbed 10.

In an embodiment, the fertilizer 60 has slow release nitrogen so that the initial sprouts from the seed will not be burned, and is high in phosphorus and potassium to provide stimulation for good root development. As with the type of grass seed, the fertilizer 60 can differ based on the needs of the client and the vegetation being grown. For example, one type of grass or seed may require a different ratio of nitrogen, phosphorus and potassium than another type of seed. As a result, the provided fertilizer 60 will change to complement the seed within the seedbed 10 that has been chosen in response to the needs of the customer. In an alternative embodiment, the nitrogen portion of the fertilizer 60 includes a controlled release product that will allow the turf to perform well during an extended portion of the growing season. In one embodiment, a nitrogen release term of 3–8 months is preferred.

In order to secure the seeds 50 and fertilizer 60 between the layers 20, 40, the present invention includes the steps of securing the layers together along its outer edges, at multiple locations along their interior facing surfaces or over their entire interior facing surfaces. In an embodiment, a bonding agent is applied to the interior facing surfaces of layers 20, 40 so that it holds these layers together as a unit after it has been laminated. As a result, the seed 50 will be securely contained between the two layers 20, 40. The boding agent can include any of the discussed biodegradable substances such as starches, modified celluloses or alcohol-based materials such as PVOH or PVA that can be used to secure two members together. Other conventional adhesives that could be used to secure the layers 20, 40 of the seedbed 10 together or as binders for each airlaid layer include cellulose ethers, acrylics, EVA and EVA latex. It is also possible to use water as the adhesive or binding agent when used in combination with a water activated starch or other binder. Paper industry standard amounts of wet strength resin used in airlaid, tissue and towel production can be used in the bonding agent to provide a small amount of temporary wet strength that could be useful for seedbed 10 integrity during the initial germination period.

In an embodiment of the present invention, the layers 20, 40 can be secured together along the perimeter of one or both layers 20, 40 and at positions that are extend inward from the perimeters. In this embodiment, the inwardly extending lines along which the layers 20, 40 are secured together can create pockets within the intermediate layer 30 for holding the seeds for growing the desired vegetation. These pockets can include the same seed(s), different seeds, a mixture of seed(s), fertilizer and/or nutrients for growing the desired vegetation(s). Accordingly, different vegetation can be grown using the same artificial seedbed 10.

In an alternative embodiment, the layers 20, 40 are secured together by embossing or perf-embossing. This would eliminate the use of water-based adhesives that might require drying.

Figure 2:
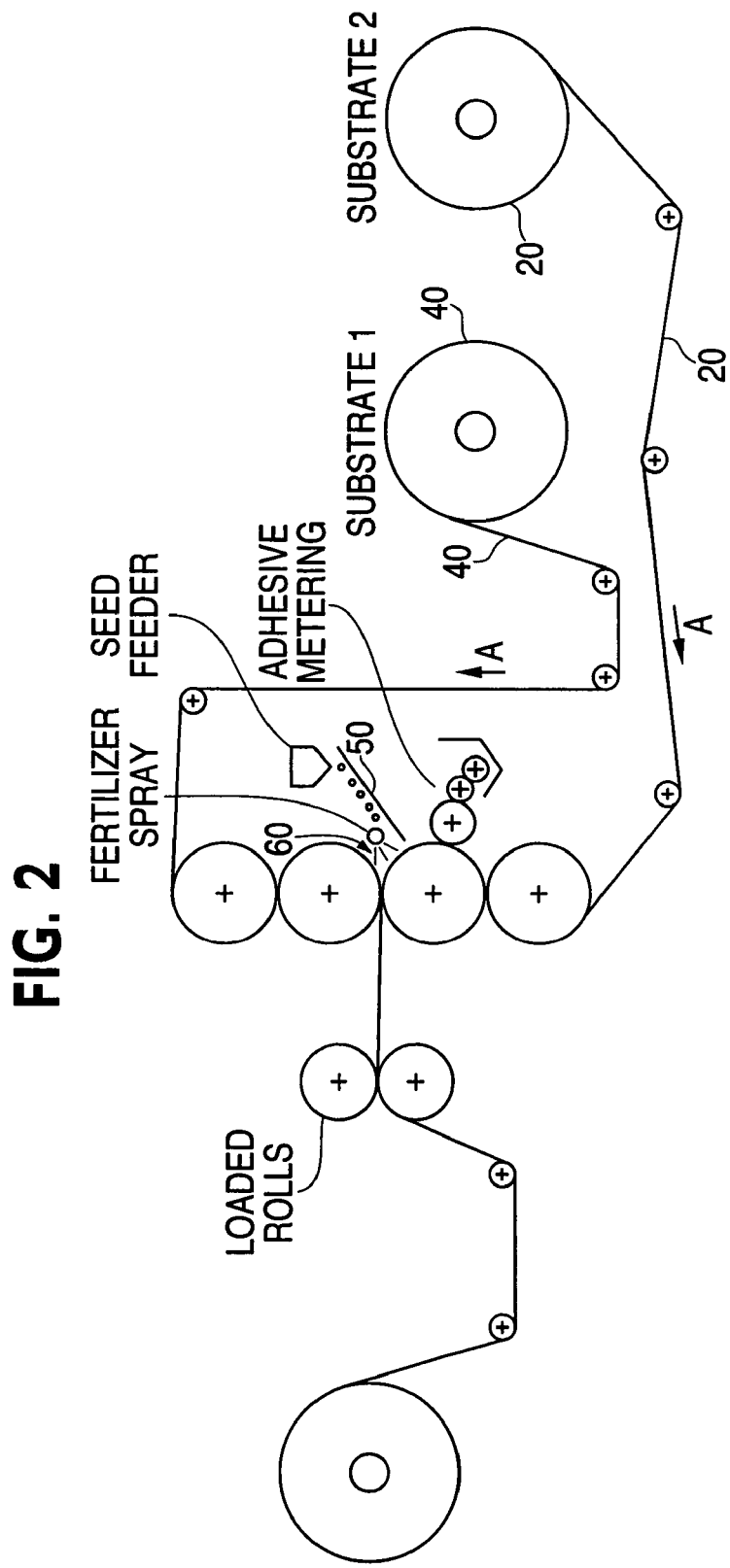
FIG. 2 illustrates a laminating process according to the present invention.

Referring now to FIG. 2, there is shown an apparatus and method for making an artificial seedbed 10 according to the present invention. Biodegradable sheets of natural fibers for the base layer 20 and the cover layer 40 are moved in the direction of the arrows A, B, respectively. As discussed above, the seedbed 10 will be understood to be made up substantially entirely of such natural fibers, although it may contain a small proportion of synthetic fibers, which may be provided in order to decrease the rate of decomposition of the resulting mat 30 when laid on the earth. The overall process according to an embodiment of the present invention will include making the individual layers using desired techniques, and then marrying layers 20, 40 together on the laminating line illustrated in FIG. 2. The cover layer 40 and base layer 20 will not necessarily be matching materials. In an embodiment, the seedbed 10 includes a heavier base layer 20 (such as an airlaid product) and a lighter cover layer 40 (such as tissue or towel formed using wet laiding). This will provide for good tensile strength while allowing the grass shoots to penetrate the cover sheet 40 easily.

Once the layers 20, 40 have been formed, they are laminated together around layer 30 as shown in FIG. 2. On the laminating line illustrated in FIG. 2, the adhesive will be added to the base layer 20. However, the adhesive could also be added to the cover layer 40 or both layers 20, 40. The adhesive can be applied using either a spray header or by passing the material of either or both layers 20, 40 through a coater. In an embodiment, a coater is used to apply a light coating of adhesive to the base layer 20 that does not require oven drying of the seedbed 10. However, it may be possible to pass the seedbed 10 through a high-temperature oven and drive off the majority of the water without raising the temperature of the seeds above the critical mark of approximately 140 degrees Fahrenheit. The liquid fertilizer may be a component of this adhesive and thereby applied simultaneously with the adhesive. As shown in FIG. 2, the seed can be added using a hopper-style feeder. The hopper will allow feed-rate adjustments so that the desired seed distribution and density can be achieved. The adhesive will not only allow the cover layer 40 to adhere to the base layer 20, but will also secure the seeds to the bottom substrate 20. The seeds 50 should be added as close as possible to the point where the cover layer 40 meets the base layer 20 along the lamination machine. This will quickly fix the seeds in place and minimize material loss. If granular fertilizer is used, it can be added with a hopper feeder separate from that used for the seed or in the same hopper as the seed. However, the changing size ratios with different seeds could make it difficult to get an even distribution of seed and fertilizer when using a seed/fertilizer mix in a single hopper.

After the addition of the seed 50, fertilizer 60, and the adhesive, the layers 20, 40 are secured together. The laminating roll must be soft enough to bond the substrates without crushing the seeds. The formed seedbed 10 can have a diameter and width that will be relatively convenient to handle. In one embodiment, the seedbed 10 may have a diameter of about 24 to 36 inches and a width of 72 inches (24–36" D×72" W). The size of the product will vary with its application. For example, a home-oriented product would likely be smaller and lighter than that used for commercial or industrial application.

In another embodiment of a method for forming the seedbed 10, the seeds are applied onto a layer of loose paper fibers. Next, the seeds are covered by a second layer of fibers and a binding adhesive is sprayed over the seeds and loose fibers in order to form a three layered structure that includes grass seeds positioned between two fibrous layers having different density and porosity characteristics. In another embodiment, fibers that form a cover layer and seeds are both simultaneously released from a hopper and placed on a previously formed paper base layer. Then, a binding agent is applied to secure the fibers of the cover layer that are mixed with the seeds to each other, the seeds and the base layer.

It is also possible that super absorbent polymers (SAP) could be added to the seedbed 10 in order to provide a vehicle for supplying more water to the seeds 50. However, this could increase production times and production costs. Also, a finished seedbed 10 with more than two paper layers having separate seed and/or fertilizer types incorporated between the various layers could also be formed. In another embodiment, the fertilizer 60 is added to the airlaid layer during the initial production of that layer in order to reduce the total number of manufacturing steps needed to form the seedbed 10.

In testing of the present invention, numerous layers of different materials were produced. These layers included pulp sheets, tissue, towel, and airlaid products. It was found that in some embodiments that airlaid substrates work well as base layers, but as cover layers they have a slower grass shoot penetration rate. In general, grass roots are better at penetrating a substrate than are grass shoots. Therefore, in an embodiment, a lightweight material, such as a tissue or towel, will likely be used as the cover layer 40 and a porous heavier material such as an airlaid substrate will likely be used as the base layer 20. This porous heavier material used as the base layer 20 can provide the needed strength that the lightweight cover layer 40 cannot provide as well as being porous enough to allow the roots to penetrate through to the soil.

Samples of the seedbed 10 were developed and analyzed. In an embodiment, the seedbed 10 includes between about 4 to 8 pounds per 1000 square feet of fescue grass seed. However, as mentioned above, the seedbed 10 could include between 10 and 12 pounds of seed per 1000 square feet. In this embodiment, the seed is "STARFIRE" available from Columbia Seed Company. The fertilizer 60 in this embodiment includes Regal Liquid Green 12–6–12 fertilizer applied to at least one of the layers 20, 40 at a rate of 32 fluid ounces per 1000 square feet. The binding material used to adhere the layers 20, 40 together as a single unit about intermediate layer 30 includes a biodegradable adhesive such as polyvinyl alcohol sold by H. B. Fuller under the name WB2746 polybond adhesive. This binding material was applied at a rate of one fluid ounce per 1000 square feet. The base layer 20 and cover 40 were selected from the following table:

| Sample Number | Cover Layer 40 | Base Layer 20 |
|---|---|---|
| Sample 1 | Tissue - 13 pounds per 3000 square feet | Tissue - 22 pounds per 3000 square feet |
| Sample 2 | Tissue - 13 pounds per 3000 square feet | Airlaid - 100 grams per square meter |
| Sample 3 | Tissue - 13 pounds per 3000 square feet | Airlaid - 75 grams per square meter |
| Sample 4 | Tissue - 13 pounds per 3000 square feet | Airlaid - 50 grams per square meter |
| Sample 5 | Airlaid - 50 grams per square meter | Airlaid - 50 grams per square meter |
| Sample 6 | Airlaid - 75 grams per square meter | Airlaid - 75 grams per square meter |

Any combination of these paper layers could be used in a single seedbed 10. In the embodiments of the above samples (1–6), the airlaid sheets are conventionally formed and bonded using "StructureCote" 1891 binder from Vinamul Polymers of Bridgewater, N.J. applied at about 7 to 10 percent dry weight basis. The tissues set forth above in samples 1–4 are conventional wet laid materials manufactured without the addition of a wet strength resin by a conventional wet-laid process. The towel would be in a basis weight range of about 16 to 24 pounds per 3000 square feet (26–39 gsm) while the tissue could be at least as low as about 13 to 18 gsm. Though hydrogen bonding will take the place of a separate binder, there still may be some need for low-level wet-strength chemical addition with the tissues and towels in order to provide added durability in rainy conditions during seed establishment. The 13-pound tissue is grade #65 from Georgia-Pacific Corporation ("Georgia-Pacific"). The 22-pound tissue is grade #68 from Georgia-Pacific.

Numerous additional samples of the seedbed 10 were tested. The results are shown in Table 1 and FIGS. 3–5 that include graphs 1–3. Sample #16 was successful in that it had an 81% seed germination rate with an 81% seed penetration rate. This sample was constructed with a tissue top and a thermo-bonded airlaid material bottom. The combination of a lightweight top sheet and a heavier bottom sheet seems to be an effective combination of materials. The lightweight cover layer 40 allows sufficient shoot penetration while the heavier base layer 20 gives the seedbed 10 the strength it will need. Many of the samples tested had superior germination rates compared to the conventional "broadcast" seeding control sample.

Of the eighteen samples that were constructed and tested, with the exception of sample #7, each sample contained 192 SCOTTS ryegrass seeds and 0.5 g of 20–27–5 SCOTTS starter fertilizer sandwiched between the base layer 20 and the cover layer 40. Sample #7 contained only 88 ryegrass seeds and 0.25 g of 20–27–5 starter fertilizer (due to its size and shape). A potato starch solution was used to bond the sheets of the cover layer 40 to the base layer 20. The samples were constructed by 1) spreading the fertilizer over one of the layers 20, 40; 2) placing three seeds per square inch onto one of the layers 20, 40; 3) spraying approximately 25 g of starch solution over the seeds positioned within the seedbed 10; and 4) placing the other of the layers 20, 40 of sheet over the seed 50 supporting layer and pressing firmly. The seedbed 10 was then allowed to dry overnight.

After the samples dried, each sample was placed in a plastic tray (11 inch diameter), which contained 1.5 inches of damp potting soil. Initially, each sample received 200 mL of water per day. However, the amount of water was later reduced to 100 mL per day. The sample trays were placed under growing lamps for 12 hours per day. On a daily basis, the number of grass shoots that had penetrated the top sheet were counted. General comments pertaining to each sample were noted, such as development of slime spots, cracks, and biodegradability. After twenty-two days the experiment was stopped. Then, the total number of shoots, including the ones that grew but did not penetrate through the cover layer 40, were counted and a percent germination was calculated. Table 1 contains a brief sample description, a construction description and an overall rating of sample performance. Table 1 also contains information on the properties of the materials used to construct each sample.

In FIG. 3, Graph 1 shows information pertaining to the number of shoots that actually penetrated through the top sheet of the sample. In FIG. 4, Graph 2 depicts percent germination information. In FIG. 5, Graph 3 depicts the modified percent germination information. To obtain this modified percent germination information, the total number of seeds affected by "slime spots" per sample was calculated. Then an adjustment to the total number of seeds planted was made to account for the number of seeds negatively affected by the "slime spots". Example, sample #8 developed a "slime spot" with a total area of 14.8 in$^2$. There are 3 seeds per square inch. So, 14.8×3=44 seeds that were negatively affected by the "slime spot". Originally, each sample contained 192 seeds. So, 192−44=148 modified total number of seeds for this sample. This modified total number of seeds would be used to calculate the modified percent germination information. The slime spots were attributed to the level of watering provided to the seedbed 10, not the types of materials in which they appear.

While there have been shown and described and pointed out fundamental novel features of the present invention as applied to preferred embodiments thereof, it will be understood that various omissions and substitutions and changes in the form and details of the devices illustrated, and in their operation, may be made by those skilled in the art without departing from the spirit and scope of the invention as broadly disclosed herein.

TABLE 1

| Sample ID | Material | Construction Description | Tensile (Ns/cm) | Dry Caliper (mm) | Wet Caliper (mm) | BW (gsm) | Dry Density (g/cc) | Wet Density (g/cc) | Porosity (ft.3/ min/ft) | Overall Rating |
|---|---|---|---|---|---|---|---|---|---|---|
| 1. | Control | | X | X | X | X | X | X | X | |
| 2. | Paper Towel A | Top & Bottom | 2.7 | 0.53 | 0.33 | 50 | 0.09 | 0.15 | 29.80 | Fair |
| 3. | Pulp Sheet A | Top & Bottom | 46.1 | 0.35 | 0.50 | 150 | 0.43 | 0.30 | N/A | Poor Top |

TABLE 1-continued

| Sample ID | Material | Construction Description | Tensile (Ns/cm) | Dry Caliper (mm) | Wet Caliper (mm) | BW (gsm) | Dry Density (g/cc) | Wet Density (g/cc) | Porosity (ft.3/ min/ft) | Overall Rating |
|---|---|---|---|---|---|---|---|---|---|---|
| 4. | Blotter Sheet | Top & Bottom | 63.7 | 0.59 | 0.83 | 273 | 0.46 | 0.33 | N/A | Poor Top |
| 5. | Pulp Sheet B | Top & Bottom | 69.7 | 0.63 | 1.04 | 300 | 0.47 | 0.29 | N/A | Poor Top |
| 6. | Dexter Material | Top & Bottom | 6.8 | 0.36 | 0.43 | 57 | 0.16 | 0.13 | 162.00 | Good |
| 7. | Pulp Sheet C | Top & Bottom | 7.6 | 0.32 | 0.52 | 60 | 0.19 | 0.12 | 24.60 | Fair |
| 8. | Reclaim Packing Material | Top & Bottom (3 ply for both) | 5.8 | 1.93 | 0.88 | 169 | 0.09 | 0.19 | 43.00 | Good |
| 9. | Pulp Sheet D | Top & Bottom | 27.0 | 0.27 | 0.41 | 100 | 0.37 | 0.24 | N/A | Poor Top |
| 10. | Hydro Entangled Airlaid Material | Top & Bottom | 3.2 | 0.85 | 0.77 | 113 | 0.13 | 0.15 | 94.60 | Fair |
| 11. | Paper Towel B | Top & Bottom | 3.7 | 0.63 | 0.71 | 39 | 0.06 | 0.05 | 193.00 | Excellent |
| 12. | Paper Towel C | Top & Bottom | 2.4 | 0.64 | 0.71 | 71 | 0.11 | 0.10 | 119.00 | Excellent |
| 13. | Tissue A | Top & Bottom | 1.0 | 0.17 | 0.13 | 23 | 0.14 | 0.17 | 110.00 | Excellent |
| 14. | Towel D | Top & Bottom | 1.9 | 0.17 | 0.16 | 28 | 0.16 | 0.18 | 52.90 | Good |
| 15. | Airlaid Material A | Top & Bottom | 2.2 | 0.77 | 1.32 | 94 | 0.12 | 0.07 | 127.00 | Poor Top |
| 16. | Split Thermo Airlaid Material and Tissue | Material Separated Tissue Top & AL Pulp Mass Bottom | 1.5 0.9 | 0.17 0.79 | 0.19 1.00 | 18 80 | 0.10 0.10 | 0.10 0.08 | 245.00 312.00 | Excellent N/A |
| 17. | Airlaid Material A & 300 gsm Pulp Sheet | BTAL Top & 300 gsm Bottom | 2.2 69.7 | 0.77 0.63 | 1.32 1.04 | 94 300 | 0.12 0.47 | 0.07 0.29 | 127.00 N/A | N/A |
| 18. | 100% Fluff Airlaid w/o Tissue | Top & Bottom | 1.1 | 0.67 | 0.43 | 59 | 0.09 | 0.14 | 245.00 | |

We claim:

1. An article for use in growing vegetation, said article comprising:
   a base layer formed of wood-derived cellulose fibers said base layer having a wet density of at least about 0.07 grams per cubic centimeter;
   a cover layer formed of biodegradable natural fibers, said cover layer having a different porosity, a different basis weight and a different density relative to said base layer; wherein said cover layer having a wet density of about 0.05 to about 0.20 grams per cubic centimeter;
   an intermediate layer between portions of said base layer and said cover layer, wherein said intermediate layer forms a space between a portion of said cover layer and a portion of said base layer and includes a plurality of seeds for use in growing said vegetation; and
   a bonding agent for securing said base layer to said cover layer such that said cover layer and base layer are sealed together to contain said seeds between said base layer and cover layer.

2. The article according to claim 1 wherein said fibers of said cover layer are wood-derived cellulose fibers.

3. The article according to claim 2 wherein said base layer comprises an airlaid product and said cover layer comprises a wet laid product.

4. The article according to claim 1 wherein said base layer comprises a pulp product.

5. The article according to claim 4 wherein said pulp product includes a sheet of a pulp product.

6. The article according to claim 1 wherein said bonding agent comprises a biodegradable binder.

7. The article according to claim 1 wherein said fibers of said cover layer include jute fibers.

8. The article according to claim 1 wherein said article is formed completely of biodegradable materials.

9. The article according to claim 1 wherein said intermediate layer further includes nutrients and/or fertilizer for enhancing the growth of the vegetation.

10. The article according to claim 9 wherein at least one of said seeds is coated with said fertilizer.

11. The article according to claim 1 wherein a fertilizer is applied to at least one of said base layer and said cover layer.

12. The article according to claim 1 wherein at least one of said cover layer and said base layer includes a fertilizer for aiding in the growth of the vegetation.

13. The article according to claim 1 wherein said cover layer is secured to said base layer at positions spaced inwardly from outer perimeters of said cover layer and said base layer such that a plurality of pockets are formed in said article between said cover layer and said base layer.

14. The article according to claim 13 wherein a first of said pockets contains at least one seed for growing a first vegetation and a second of said pocket contains seeds for growing a second vegetation.

15. The article according to claim 13 wherein a first of said pockets contains at least one seed and a second of said pockets contains fertilizer and/or nutrients for aiding in the growth of the vegetation.

16. The article according to claim 1 wherein said base layer has a basis weight within a range of about 23 to about 300 grams per square meter and said cover layer has a basis weight within a range of about 13 to about 100 grams per square meter.

17. The article according to claim 16 wherein said base layer has a basis weight of about 26 to about 80 grams per square meter.

18. The article according to claim 16 wherein said cover layer has a basis weight of about 13 to about 50 grams per square meter.

* * * * *